United States Patent [19]
Latta et al.

[11] Patent Number: 5,857,759
[45] Date of Patent: Jan. 12, 1999

[54] EMERGENCY VEHICLE SIGNAL LIGHT MODULES AND LIGHT BARS EMPLOYING LIGHT PIPES

[75] Inventors: Michael D. Latta; Andrew G. Smith, both of St. Louis County, Mo.; Robert E. Kreutzer, Columbia, Ill.; Timothy M. Green; Bernard L. DiFelice, both of St. Louis County, Mo.

[73] Assignee: Code 3, Inc., St. Louis, Mo.

[21] Appl. No.: 407,879

[22] Filed: Mar. 20, 1995

Related U.S. Application Data

[63] Continuation-in-part of Ser. No. 868,385, Apr. 14, 1992, Pat. No. 5,452,188.
[51] Int. Cl.$^6$ .................................. F21V 8/00; B60Q 2/00
[52] U.S. Cl. ........................... 362/32; 362/80; 362/83.3; 362/298; 362/299; 362/282; 362/284
[58] Field of Search ................................ 362/32, 35, 80, 362/282, 283, 284, 74, 83.3, 298, 299, 319, 322, 324

[56] References Cited

U.S. PATENT DOCUMENTS 5,438,485  8/1995  Li et al. ..................................... 362/32
5,585,782  12/1996  Yosko ........................................ 362/32

FOREIGN PATENT DOCUMENTS 2066444  7/1981  United Kingdom ...................... 362/32

*Primary Examiner*—Thomas M. Sember
*Attorney, Agent, or Firm*—Senniger, Powers, Leavitt & Roedel

[57] ABSTRACT

An emergency vehicle signal light adapted to be mounted on an emergency vehicle. A light source emits visible light for illuminating a reflector. A light pipe having one end associated with the light source has its second end associated with a diverter for diverting substantially all light transmitted by the light pipe toward the reflector. The reflector is adapted to reflect the diverted light transmitted by the light pipe for observance by an observer remote from the emergency vehicle. A motion driver may be provided for rotating or oscillating the reflector about the diverter. As a result, an observer is adapted to observe discrete flashes of light resulting from flashing, rotation or oscillation, each flash corresponding to diverted reflected light forming a beam. For oscillating or rotating modules, the beam traverses across the position of the observer in response to the rotational or oscillatory motion. Alternatively, such modules may be used as part of a light bar. Alternatively, the modules may be stationary flashing modules which are flush mounted on the perimeter of an emergency vehicle.

20 Claims, 15 Drawing Sheets

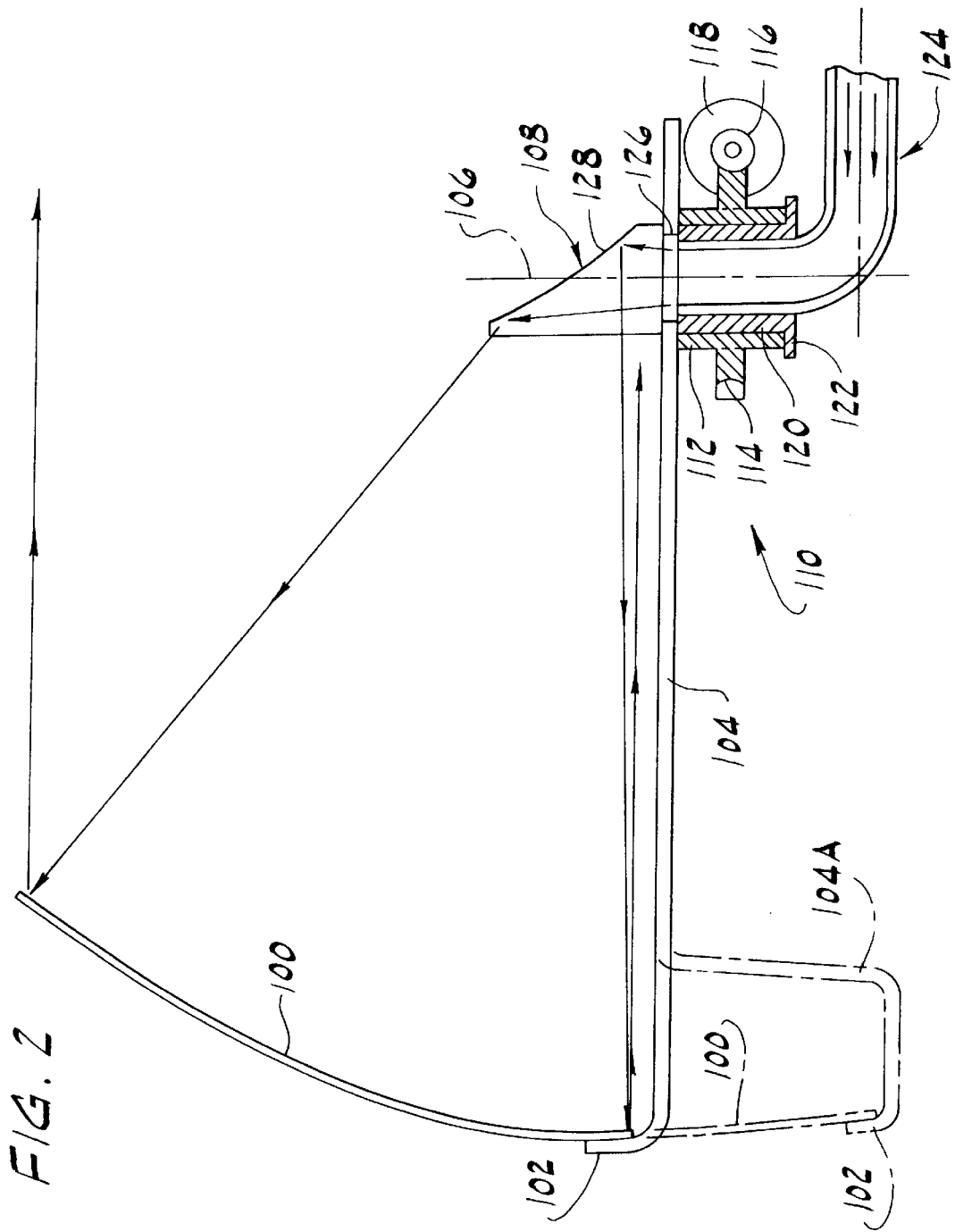

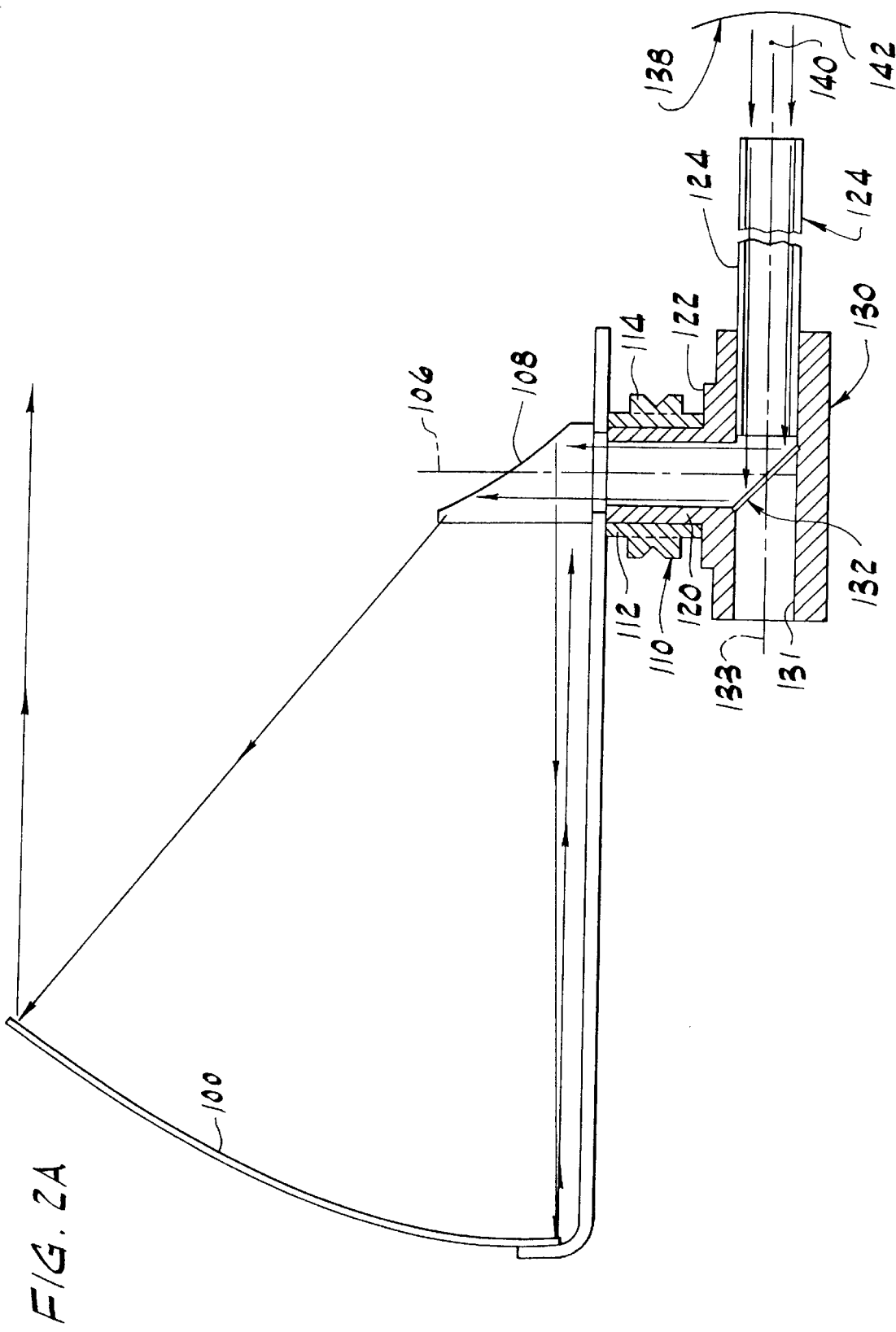

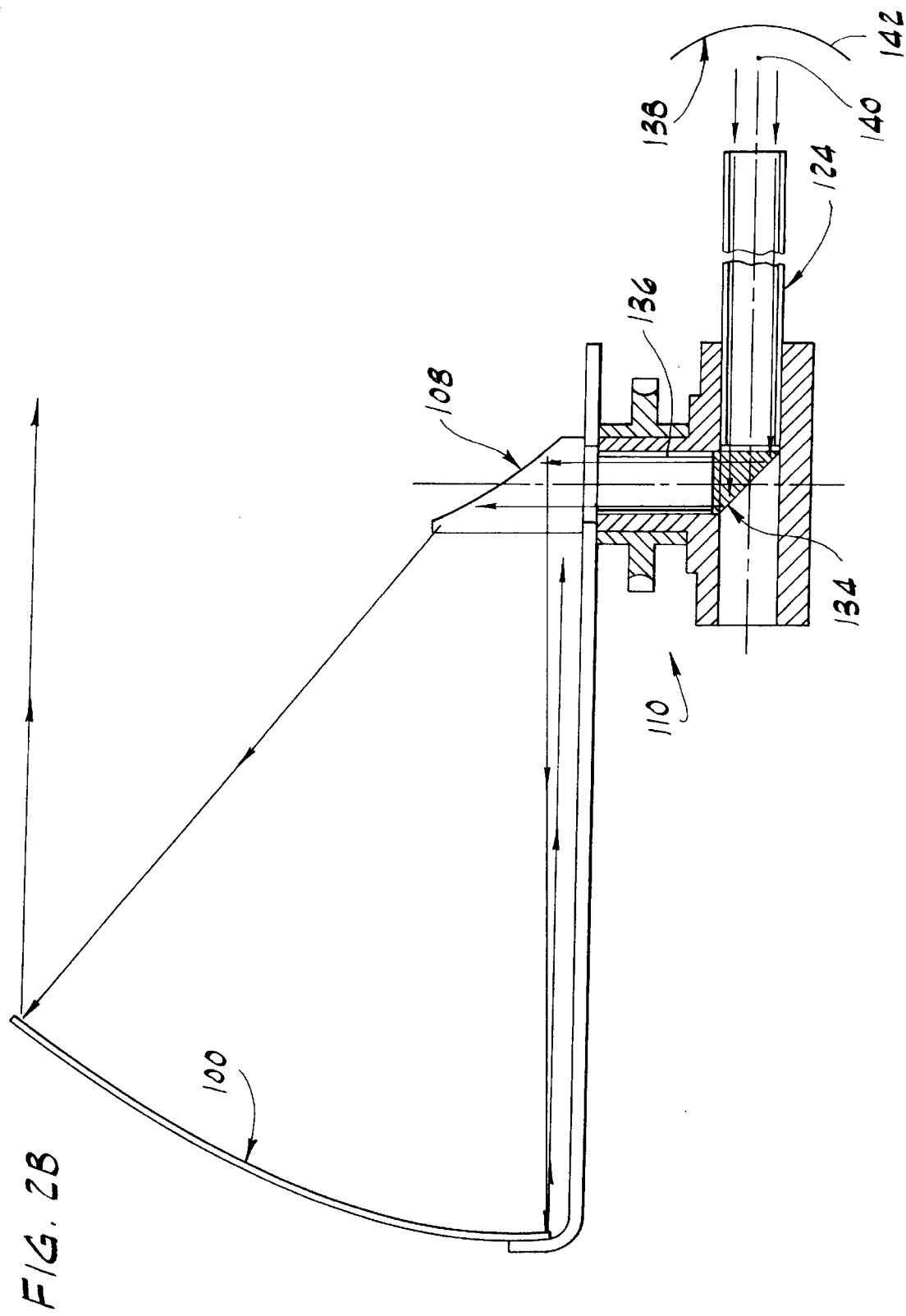

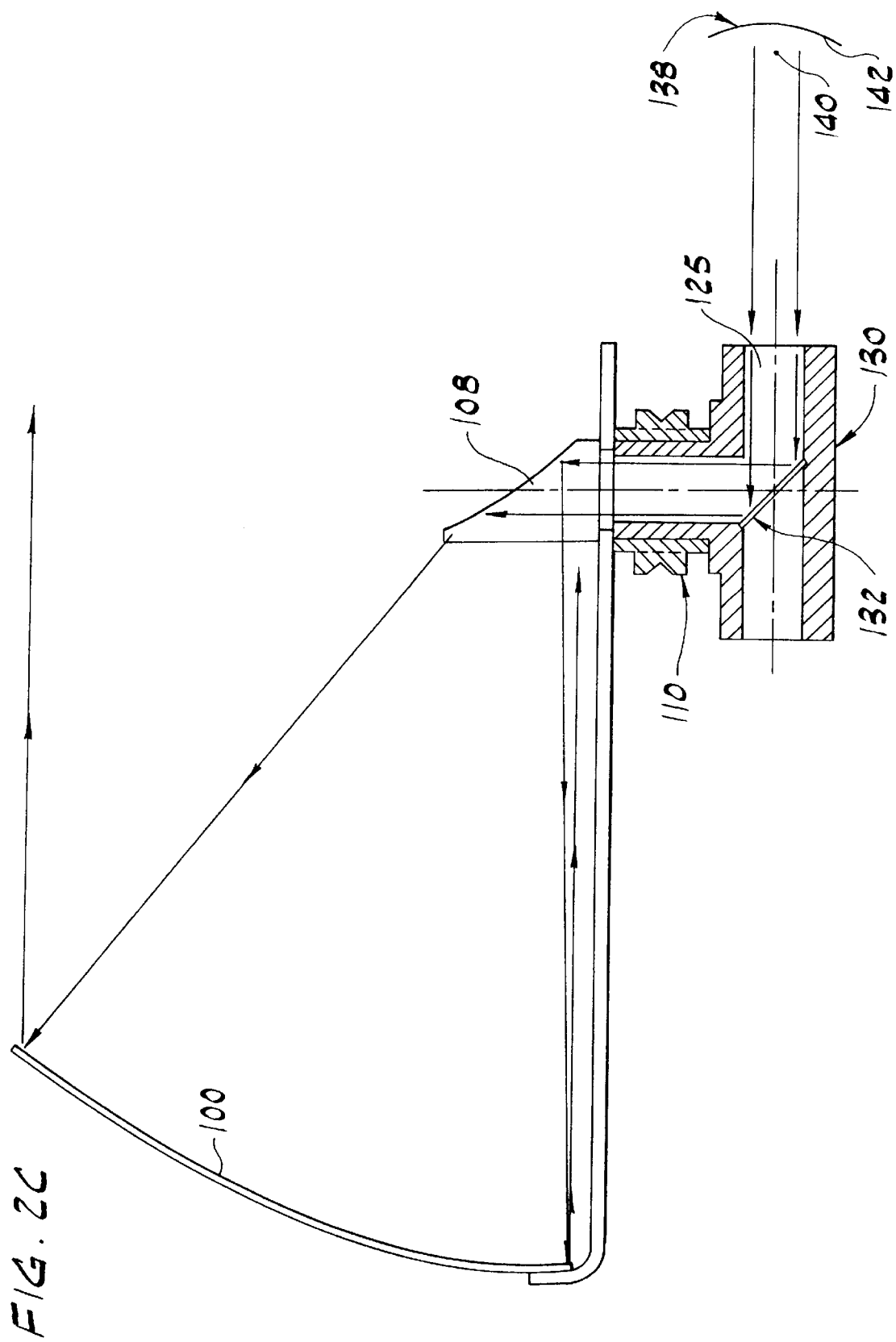

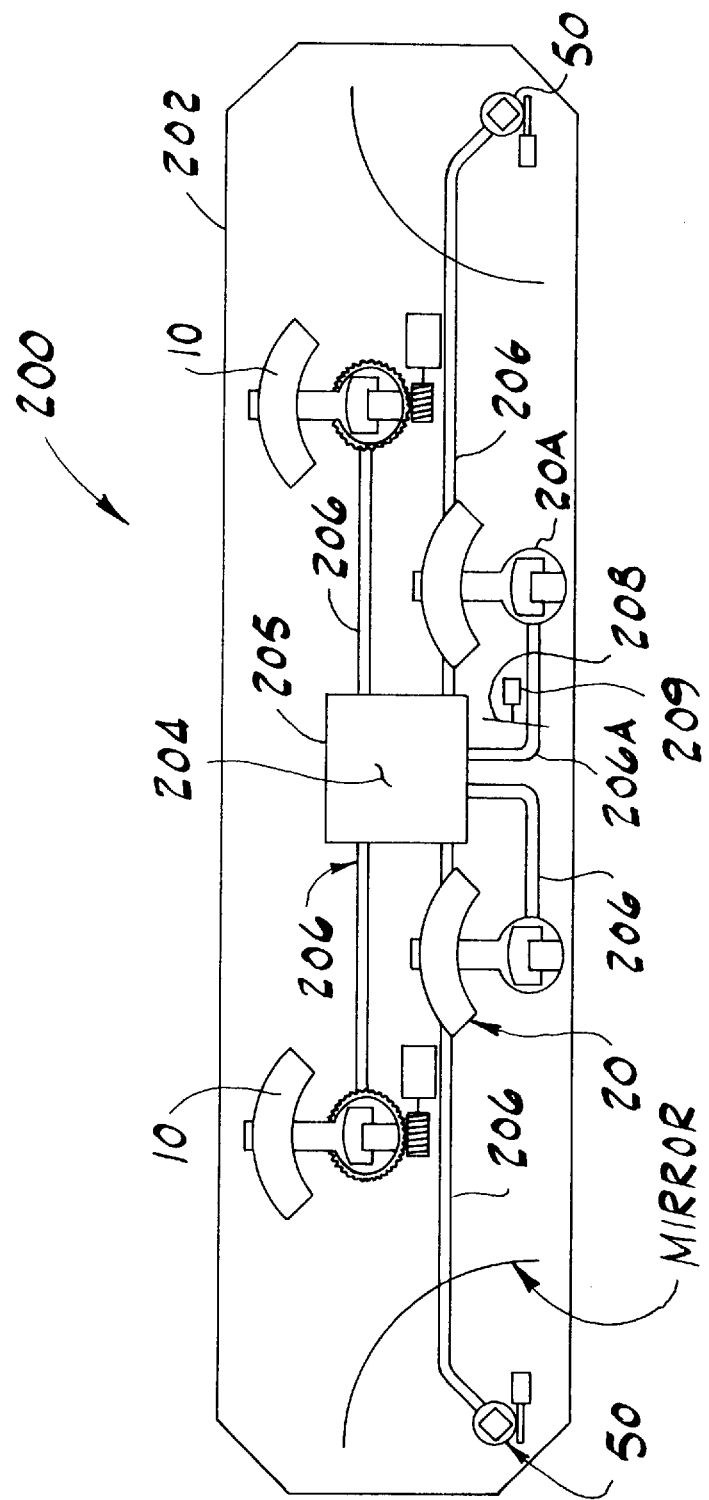

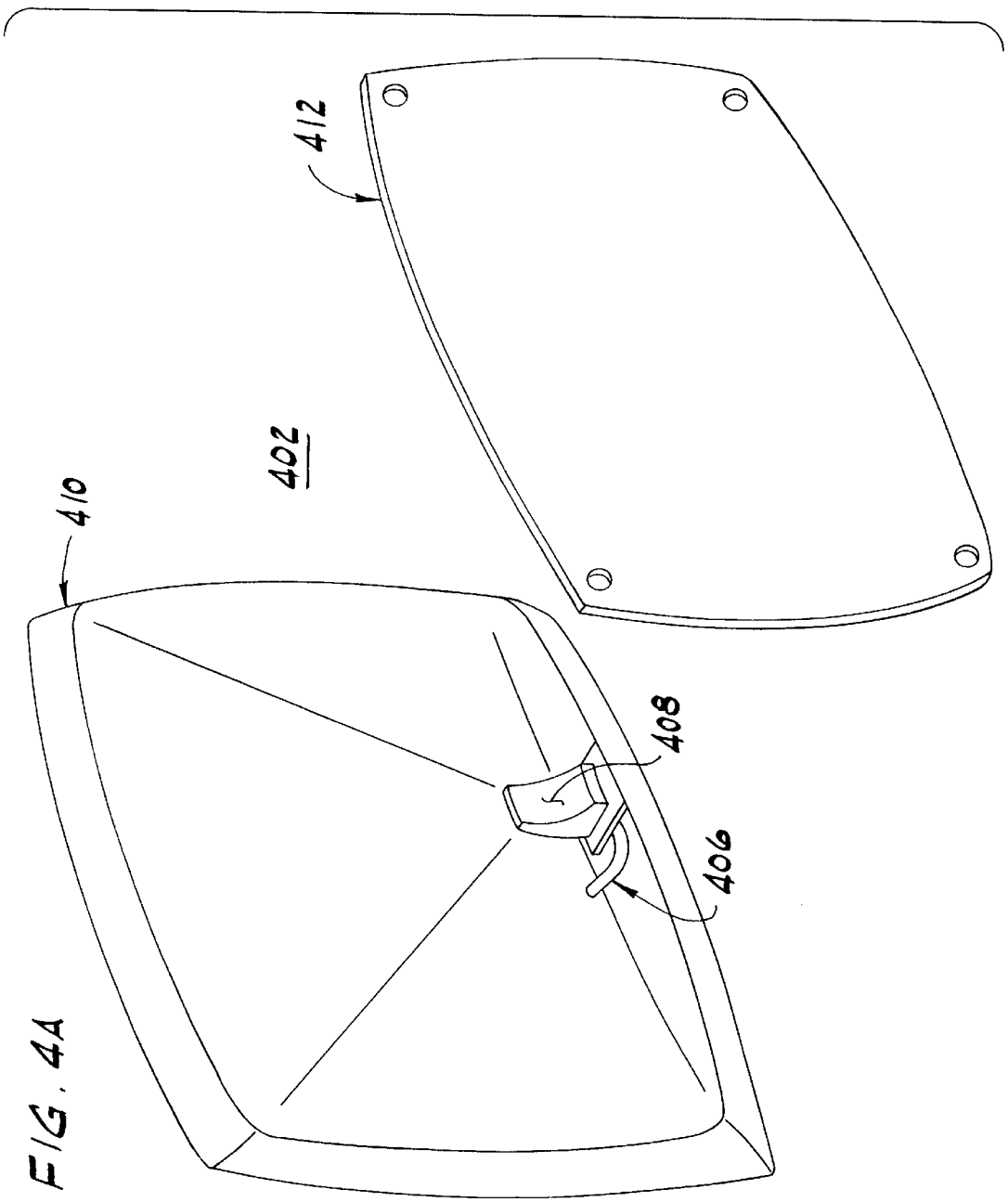

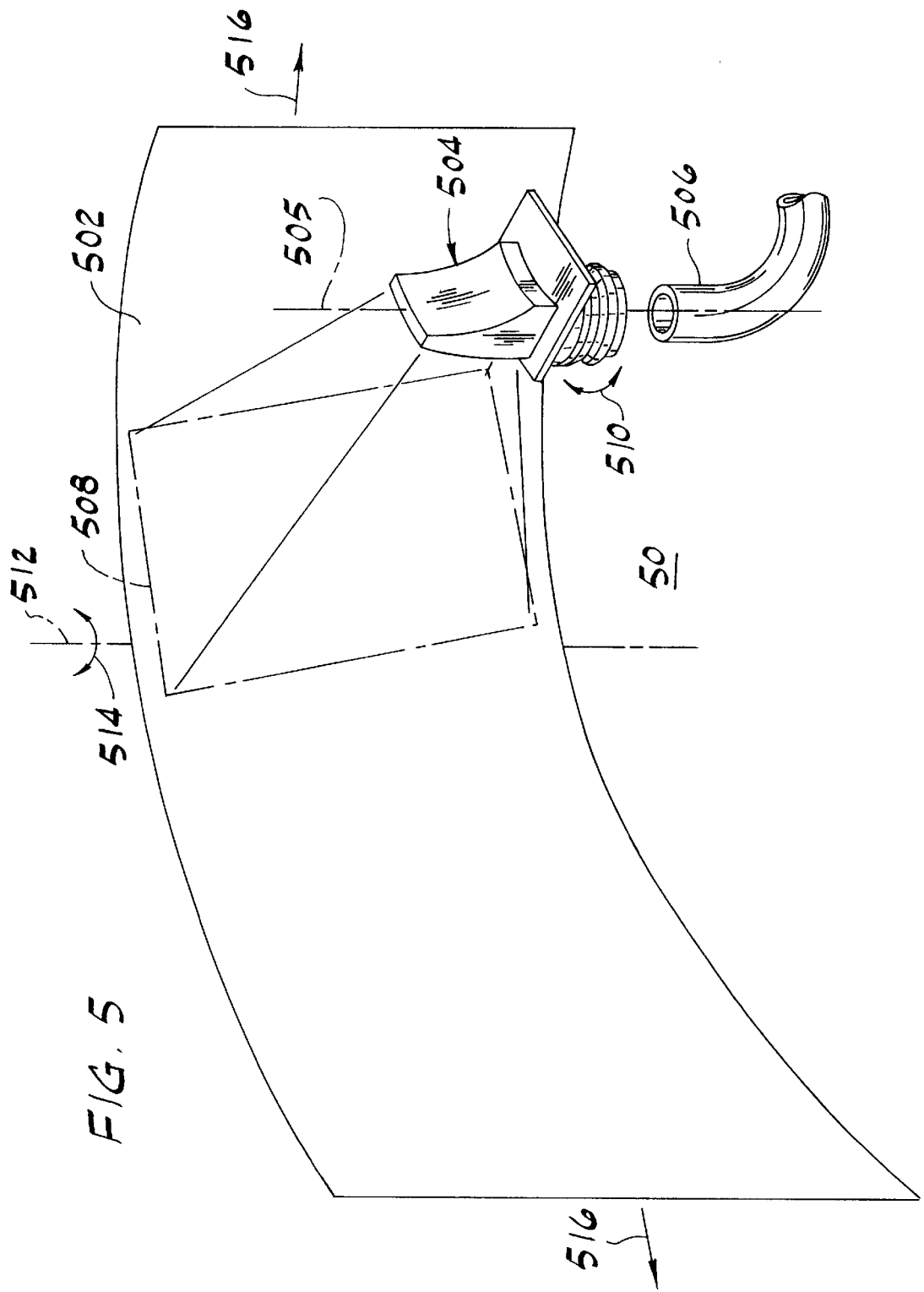

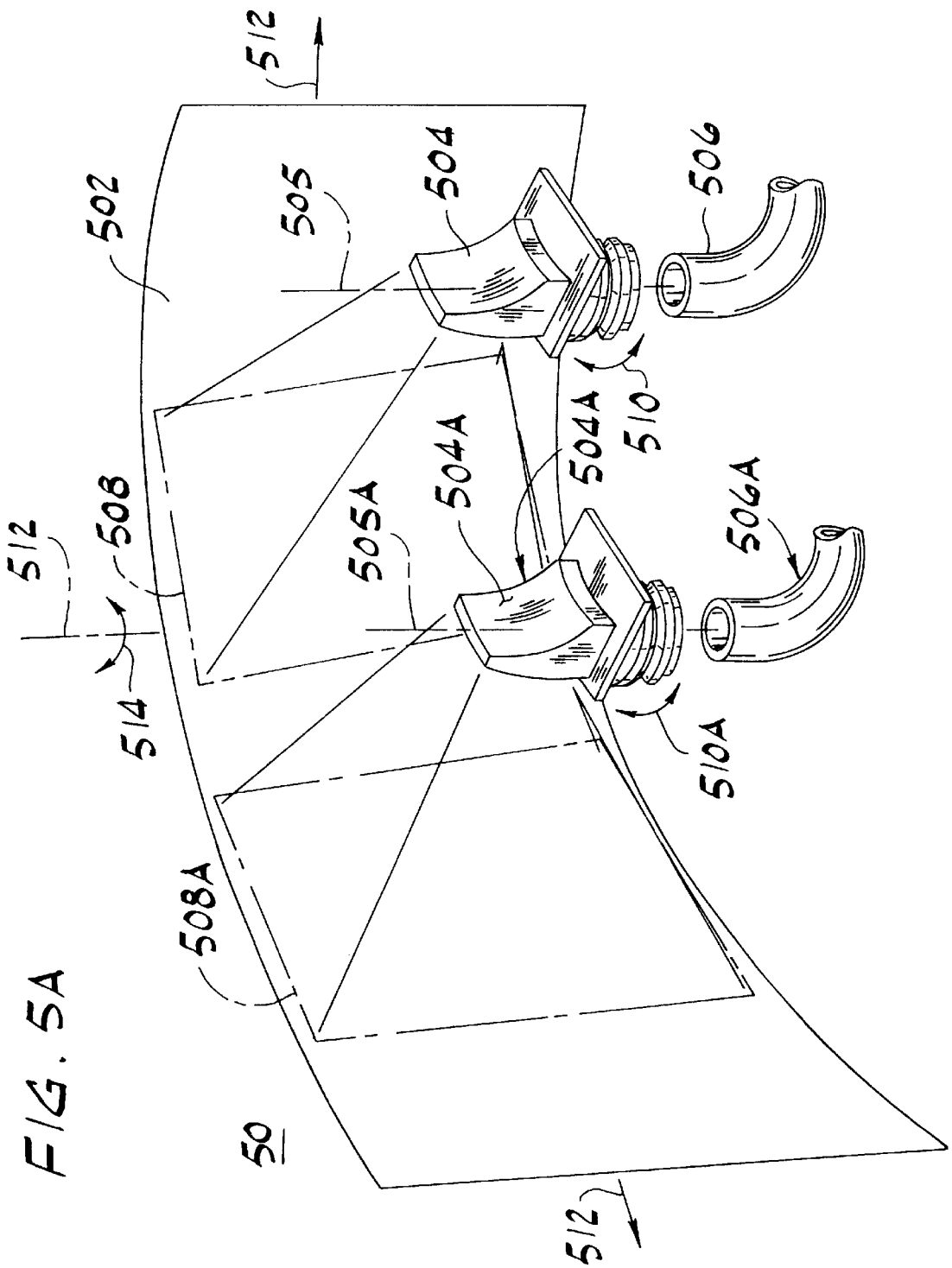

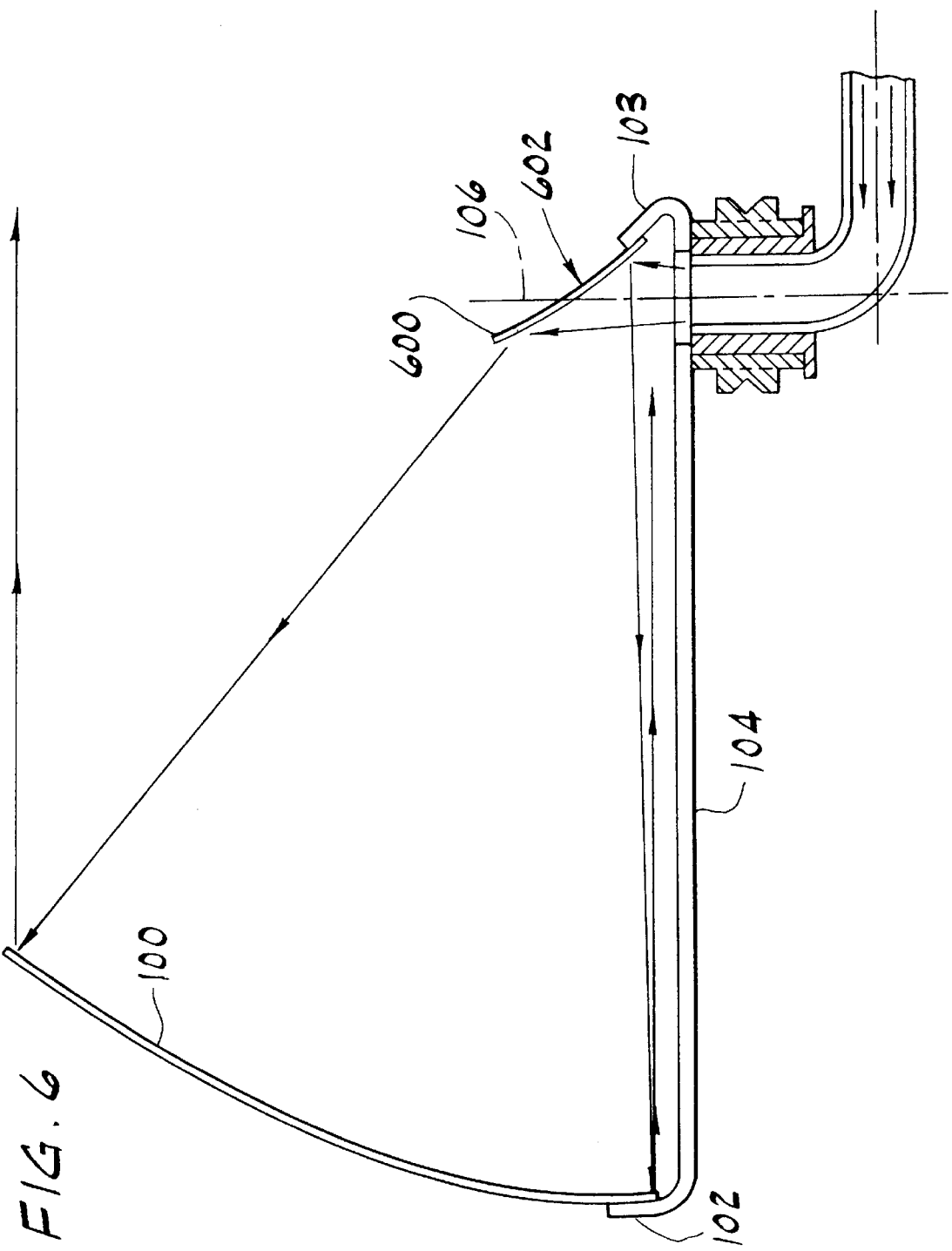

EMERGENCY VEHICLE SIGNAL LIGHT MODULES AND LIGHT BARS EMPLOYING LIGHT PIPES

CROSS REFERENCE TO RELATED APPLICATIONS

This is a continuation-in-part of co-assigned U.S. patent application Ser. No. 07/868,385 filed Apr. 14, 1992, now U.S. Pat. No. 5,452,188 the entire disclosure of which is incorporated herein by reference.

BACKGROUND OF THE INVENTION

1. Field of the Invention

The present invention relates to warning light systems and in particular light modules for installation on vehicles, especially emergency and other public service vehicles. In particular, the invention relates to light modules and light bars employing light pipes.

2. Description of the Prior Art

Emergency lighting which is mounted on police or other public service vehicles has been known in the prior art. Generally, such lighting is mounted on the exterior of the vehicle in order to provide the most visibility. For example, warning lights are frequently mounted on the roof of an emergency vehicle so that the lighting is readily apparent from a distance and is generally above the roof line of most vehicles travelling on a roadway. Exterior mounting also minimizes the possibility that the light produced by the lighting system will adversely affect the vision of someone in the emergency vehicle.

Light bars are generally the most desirable type of emergency exterior lighting because of their ability to provide a wide variety of types of illumination, because of the ease of installation, because such light bars avoid the need for vehicle modifications, and finally because of the ease of attaching and detaching such light bars. The light bar is generally a unit which spans the top of the vehicle and is supported by the vehicle by brackets which are attached to the vehicle. However, such prior art light bars generally employ multiple modules each having a lamp which can be difficult to implement and expensive to manufacture and repair. More importantly, prior art light bars, by design, have height dimensions that make the vehicles equipped with them easily identified.

There is a need for a light bar and light modules which employ light pipes used to provide visible light to the modules such that the design height is substantially reduced making them less noticeable when not operating and so that the number of light sources may be reduced. In addition, there is a need for light modules which employ light pipes and which use substantially all light supplied by the light pipes to form beams or emergency signals.

SUMMARY OF THE INVENTION

It is an object of this invention to provide modules which are extremely low in height, low cost, easily assembled, serviced or replaced.

It is another object of this invention to provide a light bar employing such modules in combination with light pipes.

It is another object of this invention to provide a light bar employing light modules which interface with light pipes and have small vertical profiles.

It is yet another object of this invention to provide light pipes interfacing with modules which may rotate, oscillate or be stationary.

It is another object of this invention to provide perimeter lighting for emergency vehicles which may be flush mounted and which may be supplied light by light pipes.

In one form, the invention comprises an emergency vehicle signal light adapted to be mounted on an emergency vehicle. A light source emits visible light. A light pipe having a first end associated with the light source transmits at least some of the visible light emitted by the light source from its first end to its second end. A diverter associated with the second end of the light pipe diverts substantially all light transmitted by the light pipe toward a reflector. Therefore, the reflector reflects the diverted light transmitted by the light pipe for observance by an observer remote from the emergency vehicle. Means rotates the reflector and the diverter in synchronization whereby the observer is adapted to observe discrete flashes of light resulting from the rotation of the reflector by the rotating or oscillating means, each flash corresponding to diverted, reflected light forming a beam which traverses across the position of the observer as the reflector is rotated. Oscillating and stationary modules are also forms of the invention. A light bar employing such modules is also one form of the invention.

Other objects and features will be in part apparent and in part pointed out hereinafter.

BRIEF DESCRIPTION OF THE DRAWINGS

FIG. 2 is a partial cross sectional diagram showing the rotating reflector module of FIG. 1.

FIGS. 2A, 2B and 2C are partial cross sectional diagrams of alternative configurations of the module of FIG. 1. FIG. 2A illustrates the combination of a horizontal light pipe, a reflective mirror element and an air channel between the columnating light source and the light dispersion means. FIG. 2B illustrates the combination of a horizontal light pipe, a reflective prism element and a vertical light pipe between the columnating light source and the light dispersion means. FIG. 2C illustrates the combination of a first air channel, a reflective mirror element and a second air channel between the columnating light source and the light dispersion means.

FIG. 3 is a top plan view of a light pipe light bar according to the invention including a rotating wheel for filtering or flashing light supplied to a stationary module.

FIG. 4A is a perspective view illustrating one stationary flashing module having a flush mounted housing.

FIG. 5 is a perspective illustration of an oscillating reflector module according to the invention.

FIG. 5A is a perspective illustration of an oscillating reflector module according to the invention having two diverters.

FIG. 6 is a cross sectional diagram of another preferred embodiment of a rotating reflector module according to the invention having a convex light dispersion means and a concave reflector.

Corresponding reference characters indicate corresponding parts throughout the drawings

DETAILED DESCRIPTION OF THE PREFERRED EMBODIMENTS

Figure 1:
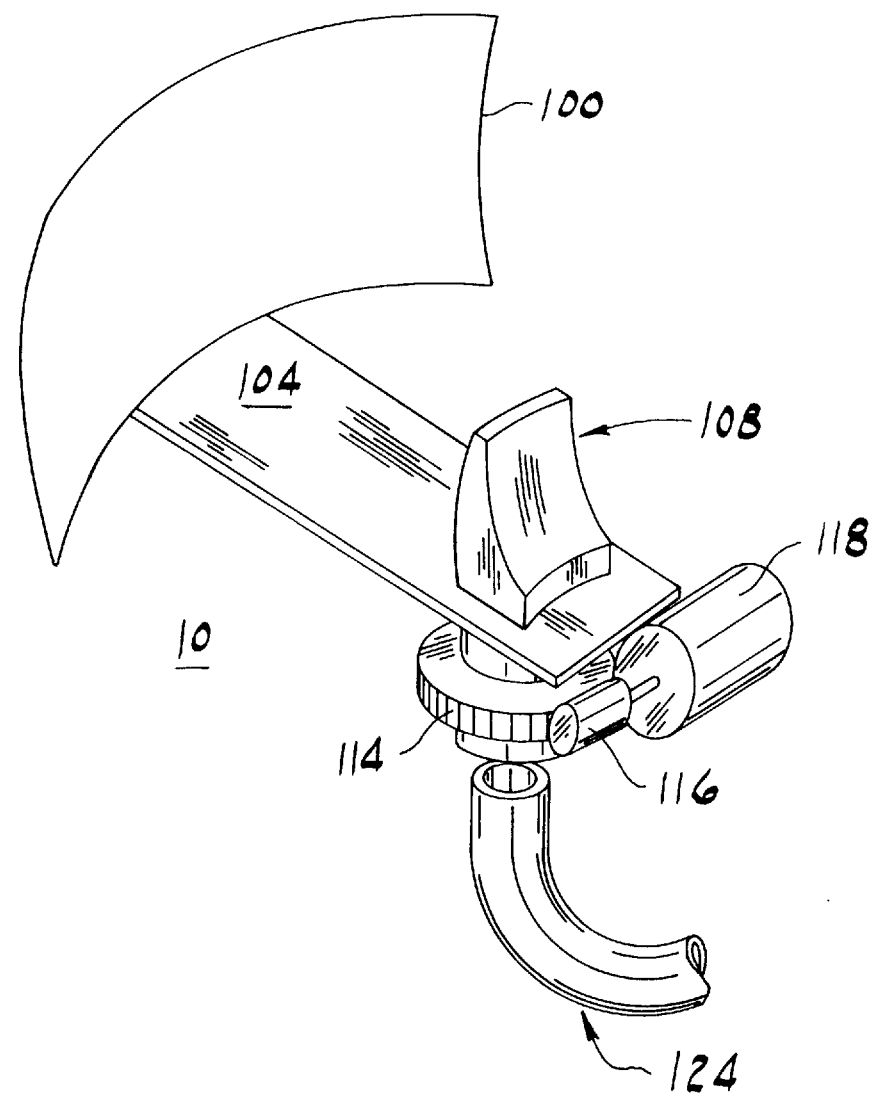
FIG. 1 is a perspective illustration of one preferred embodiment of a gear driven rotating reflector module according to the invention.

Referring to FIGS. 1 and 2, a rotating module 10 according to the invention is illustrated. The module 10 includes a reflector 100 supported in a substantially vertical position by an upwardly directed flange 102 of horizontal base 104. Although the reflector 100 is illustrated as spherical in shape, it is contemplated that the reflector 100 may be of any optical configuration in order to create a beam of light to be viewed by an observer remote from the rotating module. Preferably, the module rotates about a vertical axis 106 which is coaxial with a light diverter or lens such as light dispersion means 108 also positioned on the base 104. The rotation is in response to motion driving means 110 including a rotor member 112, a spur gear 114, a worm gear 116, and a motor 118. Base 104 is held in a substantially horizontal position by downwardly projecting rotor member 112 which is rigidly affixed to the underside of base 104 or may be an integral part of base 104. Spur gear 114 is integral with or added to the outer surface of rotor member 112. Spur gear 114 is driven by worm gear 116 rotated by motor 118.

Reflector 100, base 104, dispersion means 108, rotor member 112, and spur gear 114 form a unitary assembly which synchronously rotates about axis 106 and is held in place by a hollow vertical shaft 120 coaxially positioned within a bore of rotor member 112. The lower edge of shaft 120 terminates in a horizontal flange 122. The upper surface of flange 122 supports the lower surface of rotor member 112 and the lower surface of flange 122 may be attached to, be part of or rest upon a light channel assembly (see FIGS. 8A and 8B) or other support member, not illustrated. A lubricant or bearing member may be located between the outer peripheral surface shaft 120 and inner bore of rotor member 112 in order to minimize friction therebetween so that the rotor member 112 may freely rotate about shaft 120. In addition, lubricant or other anti-friction means may be positioned between the upper surface of flange 122 and the lower surface of shaft 120, and between upper surface of shaft 120 and the underside of base 104.

Shaft 120 has a vertical, centrally-located opening therein which is coaxial with axis 106 for receiving an end of an optical fiber, fiber bundle or other light pipe 124 for carrying light to be transmitted to and diverted by light dispersion means 108. Base 104 is provided with an opening 126 positioned between light dispersion means 108 and light pipe 124 for permitting light emitted by light pipe 124 to pass through base 104 and into light dispersion means 108. Such light is then reflected by the convex light reflecting surface 128 of light dispersion means 108 so that substantially all light transmitted by the light pipe 124 is directed toward and fills the reflector 100. As shown in FIG. 2, the central axis of the end of the light pipe 124, the central axis of light dispersion means 108, the central axis of opening 126 and the central axis of shaft 120 and rotor 112 are all coaxial with each other and coaxial with axis 106 thereby permitting rotation or oscillation of the assembly about axis 106. In general, reflector 100 is adapted to reflect the light diverted by light dispersion means 108 and transmitted by light pipe 124 to form a beam of substantially parallel light for observance by an observer remote from its position. For example, the module of FIGS. 1 and 2 may be part of a light bar mounted on an emergency vehicle and the light reflected from reflector 100 would present an emergency signal light beam indicating the position of the emergency vehicle. As a result, the observer is adapted to observe discrete flashes of light resulting from the rotation of the reflector 100 by the rotor member 112 driven by worm gear 116. Each flash of light observed by the observer corresponds to diverted, reflected light forming a beam which traverses across the position of the observer as the reflector assembly is rotated.

Although FIGS. 1 and 2 illustrate a single light pipe for providing light to light dispersion means 108, it is contemplated that light pipe 124 may be a bundle of optical fibers as well as a single optical fiber.

In general, it is contemplated that the reflector 100, base 104, rotor member 112, and shaft 120 are all lightweight plastic elements which can be manufactured by any well-known molding or forming process.

FIG. 2A illustrates one alternative embodiment for the light channel assembly 130 which receives the end of the light pipe 124 and directs light toward the light dispersion means 108. Integral with and extending below the flanges 122 is a cylindrical light channel 131 for receiving the end of the light pipe 124. The light channel 131 has an inverted T-shaped opening therein so that a light pipe may be received in the right horizontal portion, as illustrated in FIG. 2A or in the left horizontal position which is open in FIG. 2A. A reflective element 132 is positioned at the intersection of the horizontal and vertical portions which form the T-shaped channel of light channel 131. Reflective element 132, which may be a flat or curved mirror, is positioned at a 45° angle relative to the horizontal axis 133 of the light pipe 124 and relative to the rotational axis 106. As a result, light emitted by the end of light pipe 124 is reflected by reflective element 132, passes through the vertical portion of light channel 131 and is diverted by light dispersion means 108.

FIG. 2B is similar to FIG. 2A with the reflective element 132 replaced by a lens or prism 134 which reflects the horizontal light provided by light pipe 124 in the vertical direction. In addition, rather than an air chamber between the prism 134 and light dispersion means 108, another light pipe 136 is provided therebetween for transmitting the light reflected by prism 134 and provided to light dispersion means 108. FIG. 2C is similar to FIG. 2A with the light pipe 124 replaced by a horizontal air channel 125.

In each of the FIGS. 2A, 2B, and 2C, the light source is shown as a columnating light source 138 in the form of a lamp 140 and reflector 142 which converts the light emitted by lamp 140 into a substantially parallel light beam aimed at the end of light pipe 124 or channel 125. It is contemplated that the lamp 140 may be a high intensity discharge lamp, a strobe tube, a halogen lamp, or a combination or plurality thereof, or any other light source for supplying light to the end of the light pipe 124. Preferably, the light source columnates the light and gathers and captures all or most of the light provided by the lamp 140 so that a substantial portion of the light emitted by the lamp 140 is transmitted by the light pipe 124.

FIG. 2 is not drawn to scale. In general, it is contemplated that the height of the module 10 substantially equal the height of reflector 100 and any housing which encloses it. For example, as shown in FIG. 2 in phantom, reflector 100 and base 104 may be downwardly extended so that the height of reflector 100 substantially equals the height of the module 10. Alternatively, the vertical height of motion driving means 110 may be substantially reduced. In any case, this allows the module 10 to be part of light bar which has an extremely low vertical profile and would be inconspicuous when mounted on a vehicle. Such a bar according to the invention may have a vertical height of one half to one third of conventional bars thereby reducing cost, wind resistance and obviousness of the bar.

FIG. 3 illustrates a light bar 200 according to the invention employing several modules according to the invention. Preferably, light bar 200 would be mounted on the roof of an emergency vehicle such as a fire truck, police car or ambulance. Light bar 200 includes a housing 202 which is preferably a plastic molded, substantially transparent structure as is well-known in the art. Within the housing is located a source of illumination 204 such as a light box 205 having one or more lamps (not shown) or other light generating device therein. The source of illumination 204 emits visible light used for generating light signals for alerting observers of the location or oncoming arrival of the emergency vehicle carrying the light bar 200.

A plurality of modules are located within and spaced about the housing 200 for generating light signals from the emitted light supplied by the light source 204. By spacing the modules about the housing 200, this allows the light signals generated by the modules to be observed by many observers remote from the emergency vehicle. For example, rotating modules 10, such as illustrated in FIGS. 1 and 2, may be centrally located on either side of the light bar 200. In addition, stationary modules 20 and 20A may be located toward the rear of the light bar. Such modules may be similar to the rotating modules 10 illustrated in FIGS. 1 and 2 without the motion driving means 110, or may be similar to the flush mounted module illustrated in FIGS. 4 and 4A. In addition; oscillating modules 50 may be located toward the corners or ends of the light bar 200. Such modules may be the same or similar to the modules of FIGS. 1 and 2 configured to oscillate rather than rotate such as by operating the motor 118 bi-directionally. Alternatively, oscillating modules 50 may be such as illustrated in FIG. 5.

A plurality of light pipes 206 are located within the housing 202. At least one light pipe 206 is associated with each of the modules for interconnecting each module with the source of illumination 204 and for transmitting the emitted visible light generated by the source of illumination 204 to the associated module. In this way, visible light emitted by the source of illumination 204 is transmitted to the modules by the light pipes 206 so that the modules generate light signals from the transmitted light whereby observers are adapted to observe the visible light signals generated by the modules. As a result, each light signal corresponds to emitted, transmitted light which is viewed by the observer remote from the location and provides advance notice to the observer of the position of the emergency vehicle bearing the light bar 200.

In addition, it is contemplated that any of the modules may be provided with colored (filtered) or flashing light. For example, light pipe 206A supplying and transmitting light to stationary module 20A may have a filter or flasher wheel 208 rotated by motor 209 which intersects the light pipe 206A and converts the visible light emitted by the source of illumination 204 into various colors or which causes it to flash. For example, the wheel 208 may be divided into pie-shaped sections some of which are transparent filters or transparent colored sections which change the color of the light transmitted by light pipe 206A as the wheel 208 rotates. Alternatively, some of the sections of wheel 208 may be opaque and other sections may be colored or clear so that as the wheel 208 is rotated by motor 209, the light transmitted by light pipe 206A appears to be changing color or appears to be intermittent as it is supplied to the stationary module 20A.

Figure 4:
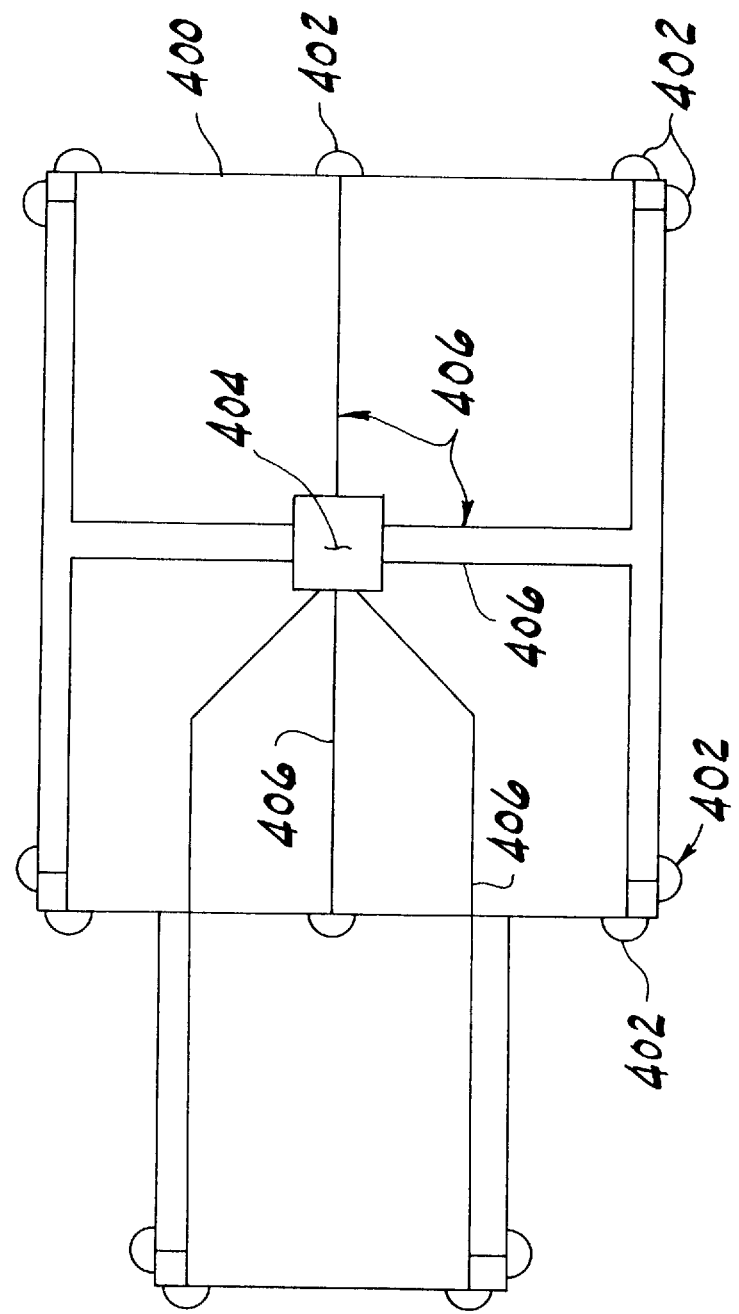
FIG. 4 is a top plan view of an emergency vehicle having perimeter mounted, stationary flashing modules in flush mounted housings according to the invention.

Referring to FIGS. 4 and 4A, another preferred embodiment of the invention is illustrated in which an emergency vehicle 400 is provided with a plurality of flush mounted light modules 402 positioned about the vehicle's perimeter. A source of illumination 404 is located on the vehicle 400. For example, the source of illumination 404 may be located at any convenient point within the vehicle such as in the engine compartment, in the passenger compartment, in the trunk, or under the vehicle. A plurality of light pipes 406 are also located on the vehicle. At least one light pipe 406 is associated with each module 402 for interconnecting each module 402 with the source of illumination 404 and for transmitting the emitted visible light provided by the source 404 to the modules 402. In this way, visible light is transmitted to the modules by the light pipes 406 so that the modules 404 generate light signals from the transmitted light. In one preferred embodiment, the source of illumination 404 may be a light box enclosing one or more strobe tubes or other lamps providing intermittent flashes of light which are transmitted by the light pipes 406 to the flush mounted light modules 402.

As shown in FIG. 4A, each module 402 includes a light dispersion means 408 associated with one of the light pipes 406 for diverting and dispersing light provided by the light pipe 406 across the surface of a light converging means such as a reflector housing 410. Preferably, the reflector housing 410 and the light dispersion means 408 are configured to generate a beam of light which may be viewed by observers remote from the vehicle 400. A clear or colored cover or filter 412 is located over the reflector housing 410 to seal it and prevent dust or moisture from collecting therein.

FIG. 5 is a schematic diagram of an oscillating module according to the invention. In this preferred embodiment, reflector 502 is stationary and light dispersion means 504 would be configured similarly to the light dispersion means of FIGS. 1 and 2 to be rotatable about an axis 505 by a motor and worm gear, not shown. In order to cause the light dispersion means 504 to oscillate back and forth across the front of reflector 502, the motor and worm gear driving the rotary motion of the light dispersion means 504 would be intermittently operated in the forward and reverse directions. Although reflector 502 is illustrated as curved, it is contemplated that any shape may be used for reflector 502 which would reflect the beam of light formed by light dispersion means 504. As illustrated in FIG. 5, the beam formed by light dispersion means 504 from the light transmitted to it by fiber optic light pipe 506 may be in a rectangular form 508 so that as the light dispersion means 504 oscillates back and forth, as indicated by arrow 510, the beam 508 would traverse to the left and right of reflector 502. This would result in the reflected beam scanning a sector and providing an emergency light signal to all observers located within the sector. It is also contemplated that light dispersion means 504 may be stationary and reflector 502 may oscillate. For example, light dispersion means 504 may be aimed at the center of reflector 502 and reflector 502 may oscillate about axis 512 as indicated by arrow 514 or reflector may move repeatedly to the left and right as indicated by arrows 516. Such oscillation would essentially result in the scanned, reflected beam scanning a sector of coverage of the oscillating module 50.

FIG. 5A illustrates an oscillating module 50A which operates the same as FIG. 5 with the addition of a second light dispersion means 504A. Means 504 is provided light by a second fiber optic light pipe 506A for generating a second beam of light by diverting its light toward reflector 502. Although second light dispersion means 504A is show adjacent means 504, it is contemplated that means 504A may be stacked above or located over means 504. In this case, the upper means 504A may be fed by a light pipe which originates from above it whereas the lower means 504 would be fed by a light pipe originating from below it. It is also contemplated that either or both of the first and second means 504 and 504A may have surfaces 128 which generate a focused or defocused beam by reflection of light off the reflector 502. It is also contemplated that in both the embodiments illustrated in FIGS. 5 and 5A, either or both means 504 and 504A may be stationary, flashing or continuously illuminating. If one of the means is flashing or rotating, it may be provided with means for deactivating the flashing or rotating to function as a continuously illuminating take-down light which constantly illuminates a particular area.

FIG. 6 illustrates another preferred embodiment of the rotating module also shown in FIG. 1. In the FIG. 6 embodiment, the light diverter has been replaced with a light dispersion means in the form of a convex mirror 600 which reflects and disperses the light provided by light pipe 124. The reflected dispersed light is then again reflected and formed into a beam by reflector 100. As shown in FIG. 6, base 104 has flange 102 at one end thereof for supporting the light converging means 100 and a second flange 103 at the other end thereof for supporting the convex mirror 600. In this way, the convex mirror 600 base 104, and light converging means 100 form a single, unitary structure which may be rotated about axis 106. Although the convex mirror is illustrated as a part of the rotating module of FIG. 6, it is also contemplated that the convex mirror 600 may be used in any of the modules or embodiments according to the invention. In each of such modules or embodiments, convex mirror 600 may be used as a light diverter or light dispersion means.

Figure 7:
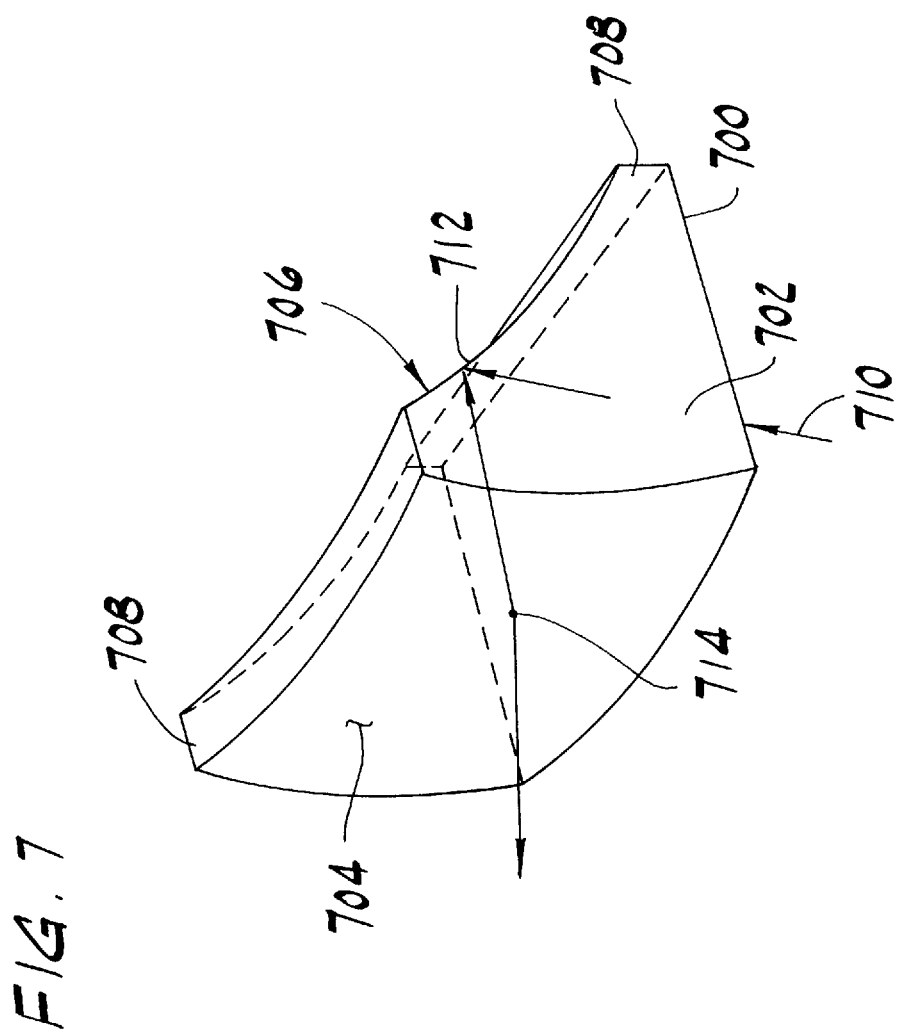
FIG. 7 is a perspective view of a light diverting and dispersing device of the invention.

FIG. 7 is an expanded illustration of one preferred embodiment of a light dispersion means or light diverter according to the invention. In particular, the light dispersion means 700 comprises a transparent light distributing lens associated with the light pipe or light channel directing the light to be beamed to the observer. A first base surface 702 faces the light pipe supplying the light and is substantially planar. A second, concave light emitting surface 704 faces the reflector which forms the beam for alerting the observer. A third surface, convex light reflective surface 706, joins the base surface 702 and the emitting surface 704. In addition, substantially flat edges 708 may be formed in the light dispersion means 700 between the emitting surface 704 and convex light reflective surface 706 and between the base 702 and convex surface 706. Light from the light pipe or other light source passes through the base surface 702, is reflected and dispersed by the convex light reflective surface 706 (which may be coated or "silvered" with a reflective coating) and passes through and is further formed into a beam by the concave light emitting surface 704. For example, a light ray 710 would enter and pass through base surface 702, be reflected at point 712 by convex surface 706, and pass through the emitting surface 704 at point 714.

Figure 8A:
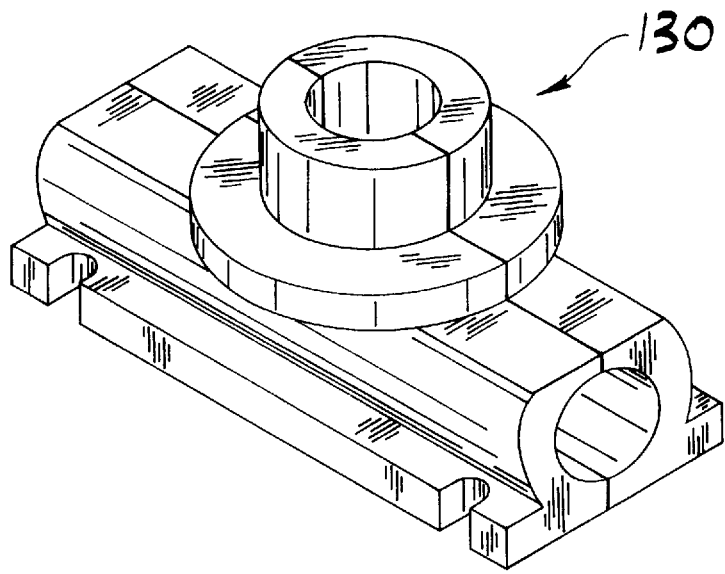
FIGS. 8A and 8B are perspective and longitudinal cross sectional views, respectively, of a light channel for supporting a light reflective element.
Figure 8B:
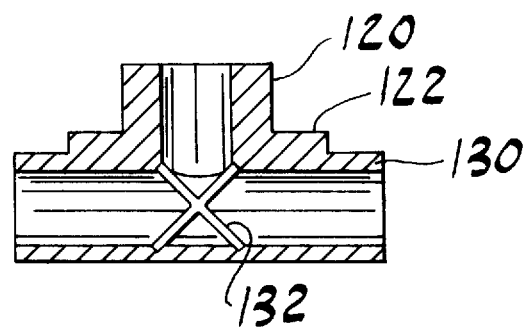

FIGS. 8A and 8B illustrate the light channel assembly 130 for supporting the light pipe 124 and on which the rotating assembly rests. Preferably, assembly 130 would be configured or molded from two identical pieces joined together and capturing the light pipe 124 and the reflective element 132. In addition, if a vertical light pipe 136 as shown in FIG. 2B is used between the light dispersing means 108 and the reflective element 132 or 134, its vertical channel would also support it. As shown in FIG. 8B, the reflective element 132 may be positioned in either of two positions depending on whether the light pipe enters the assembly from the right horizontal channel or the left horizontal channel.

Figure 9:
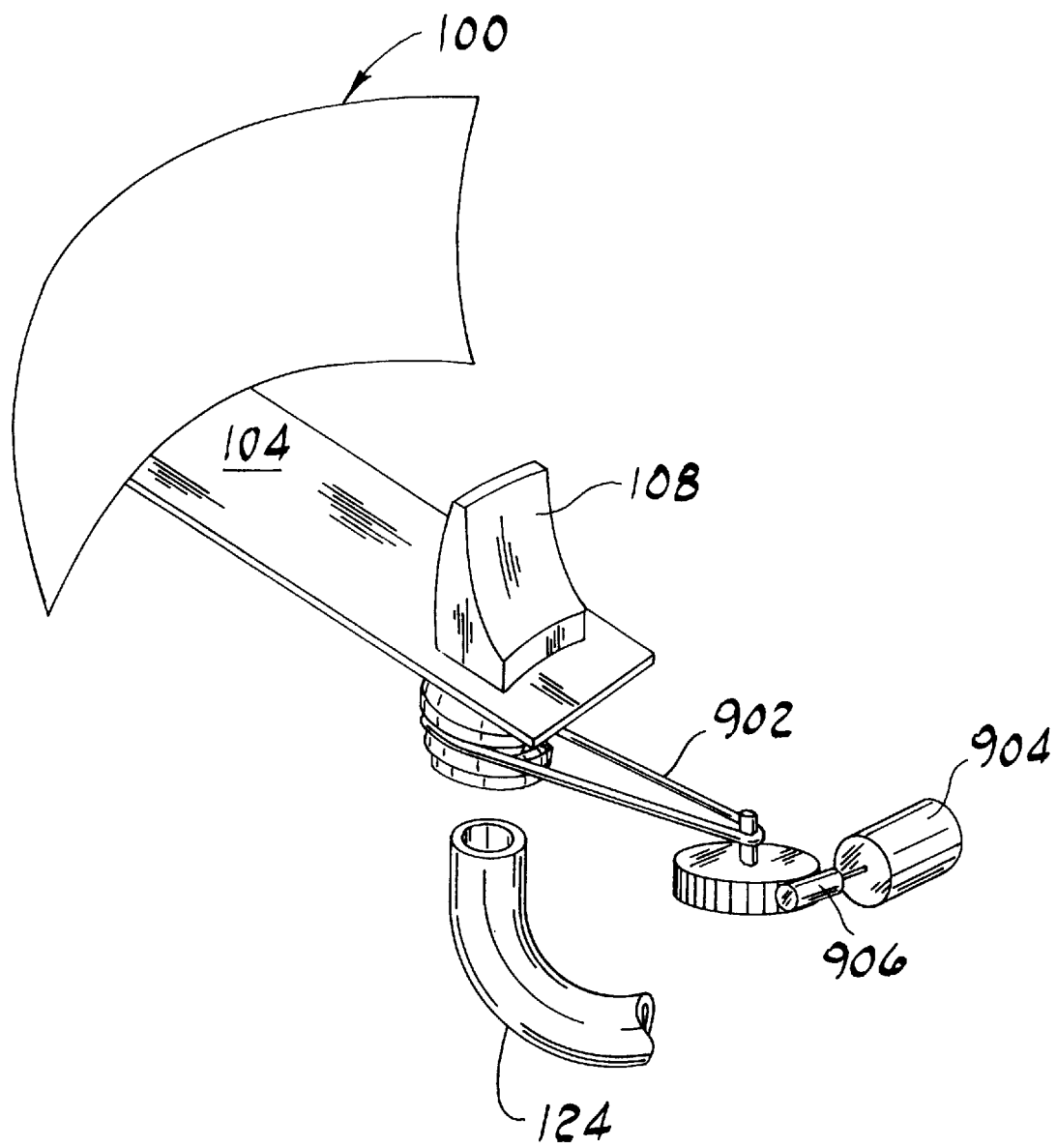
FIG. 9 is a perspective illustration of one preferred embodiment of a belt driven rotating reflector module according to the invention.
Figure 10:
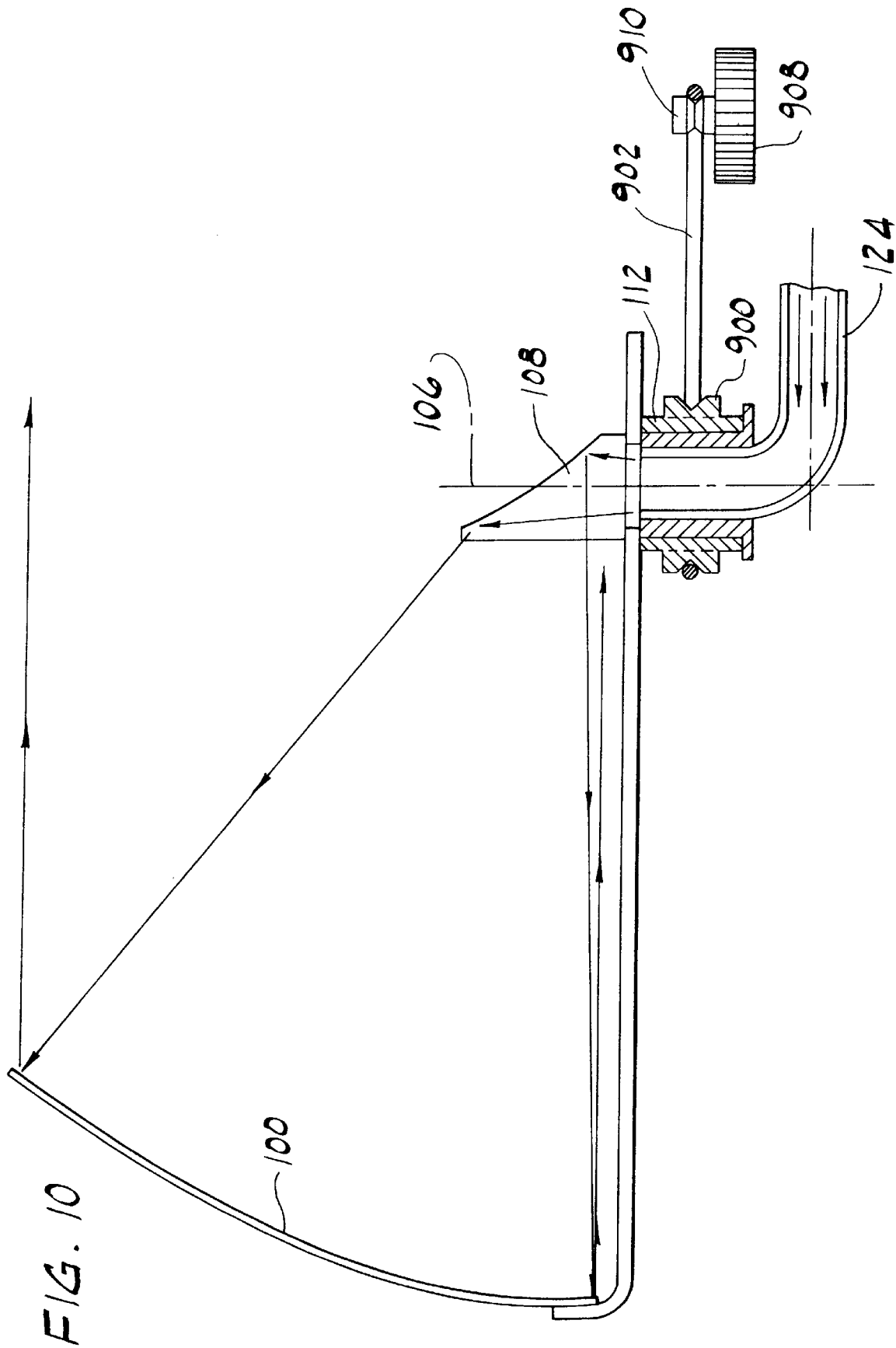
FIG. 10 is a partial cross sectional diagram showing the rotating reflector module of FIG. 9 without the motor and worm gear.

FIGS. 9 and 10 correspond to FIGS. 1 and 2 with the motion driving means comprising a belt drive. In particular, rotor member 112 has a pulley 900 on its outer surface which is engaged by a belt 902. A motor 904 drives a worm gear 906 and causes spur gear 908 and its channelled shaft 910 to rotate thereby causing belt 902, in the channel of shaft 910, to turn pulley 900 about axis 106.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. An emergency vehicle signal light adapted to be mounted on an emergency vehicle comprising:
   a. a light source for emitting visible light;
   b. a reflector;
   c. a light pipe having one end associated with the light source and a second end, said light pipe for transmitting at least some of the visible light emitted by the light source from its first end to its second end;
   d. a diverter associated with the second end of the light pipe for diverting substantially all light transmitted by the light pipe toward the reflector, said reflector being adapted to reflect the diverted light transmitted by the light pipe for observance by an observer at a position remote from the emergency vehicle signal light; and
   e. means for rotating or oscillating the reflector and the diverter in synchronization whereby said observer may observe discrete flashes of light resulting from the rotation of the reflector by the rotating means, each flash corresponding to diverted, reflected light forming a beam which traverses across the position of the observer as the reflector is rotated.

2. The emergency vehicle signal light of claim 1 further comprising a housing adapted to be mounted on the emergency vehicle and enclosing the light source, reflector, light pipe, diverter and rotating or oscillating means.

3. The emergency vehicle signal light of claim 1 wherein the light pipe is mounted substantially horizontal within a housing adapted to be mounted on an emergency vehicle and further comprising a reflective element vertically redirecting light transmitted by the light pipe toward the diverter.

4. The emergency vehicle signal light of claim 3 further comprising a second light pipe positioned between the reflective element and the diverter for transmitting redirected light toward the diverter.

5. The emergency vehicle signal light of claim 3 having an air channel positioned between the reflective element and the diverter, said air channel for transmitting redirected light toward the diverter.

6. The emergency vehicle signal light of claim 1 wherein the diverter and reflector comprise a single, interconnected, unitary assembly which rotates about an axis of the diverter.

7. The emergency vehicle signal light of claim 1 wherein the diverter comprises a convex mirror and the reflector comprises a concave mirror.

8. The emergency vehicle signal light of claim 1 further comprising a filter in line with the light pipe for filtering the light such that said observer is adapted to observe discrete flashes of colored light.

9. The emergency vehicle signal light of claim 1 wherein the reflector has a surface area and wherein the diverter comprises a light distributing means associated with the light pipe for receiving light transmitted by the light pipe and illuminating substantially the entire surface area of the reflector.

10. The emergency vehicle signal light of claim 1 wherein the diverter comprises a light dispersing lens having a first planar surface facing the second end of the light pipe, a second concave light emitting surface facing the reflector and a third convex light reflective surface joining the first planar surface and second concave surface, wherein light from the second end of the light pipe passes through the first planar surface, is reflected by the third convex surface and passes through the second concave surface.

11. An emergency vehicle signal light adapted to be mounted on an emergency vehicle comprising:
 a. a light source for emitting visible light;
 b. a reflector with a surface area;
 c. at least one light pipe having one end associated with the light source and a second end, said light pipe for transmitting at least some of the visible light emitted by the light source from its first end to its second end;
 d. at least one diverter associated with the second end of the at least one light pipe for diverting substantially all light transmitted by the light pipe toward a portion of the reflector, said reflector being adapted to reflect the diverted light transmitted by the light pipe for observance by an observer remote from emergency vehicle signal light; and
 e. means for causing oscillating movement between the reflector and the at least one diverter so that diverted light traverses the surface area of the reflector whereby said observer is adapted to observe discrete flashes of light as a result of the relative movement between the reflector and the diverter in response to the causing means, each flash corresponding to diverted, reflected light forming a beam which traverses across the position of the observer in response to the oscillating movement.

12. The emergency vehicle signal light of claim 11 further comprising a housing adapted to be mounted on the emergency vehicle and enclosing the light source, reflector, light pipe, diverter and oscillating means.

13. The emergency vehicle signal light of claim 12 wherein the light pipe is mounted substantially horizontal within the housing and further comprising a lens vertically redirecting light transmitted by the light pipe toward the diverter.

14. The emergency vehicle signal light of claim 13 further comprising a second light pipe positioned between the redirecting lens and the diverter for transmitting redirected light toward the diverter.

15. The emergency vehicle signal light of claim 11 wherein the diverter and reflector comprise a single, interconnected, unitary assembly which oscillates about an axis of the diverter.

16. The emergency vehicle signal light of claim 11 wherein the diverter comprises a convex mirror and the reflector comprises a concave mirror.

17. The emergency vehicle signal light of claim 11 further comprising a filter for filtering the light such that said observer is adapted to observe discrete flashes of colored light.

18. The emergency vehicle signal light of claim 11 wherein the reflector has a surface area and wherein the diverter comprises a scanning means associated with the light pipe for receiving light transmitted by the light pipe and distributing the light across substantially the entire surface area of the reflector.

19. The emergency vehicle signal light of claim 11 further comprising a housing adapted to be flush mounted on the emergency vehicle.

20. A light bar for an emergency vehicle comprising:
 a housing mounted on the emergency vehicle;
 a flashing light source emitting visible light and located within the housing;
 a plurality of modules located within and spaced about the housing for generating an emergency light signal from the emitted, visible light supplied from the light source, said light signal for observance by an observer remote from the light bar; and
 a plurality of light pipes located within the housing, at least one light pipe associated with each module for interconnecting each module with the light source and for transmitting the emitted visible light to the module so that visible light emitted by the light source is transmitted to the modules by the light pipes so that said modules generate light signals from the transmitted light whereby said observer may observe the visible light signals generated by the modules, each light signal corresponding to emitted, transmitted light which is viewed by the observer.

* * * * *